(12) United States Patent
Horiguchi et al.

(10) Patent No.: US 7,519,269 B2
(45) Date of Patent: Apr. 14, 2009

(54) VIDEO RECORDING/REPRODUCING APPARATUS AND METHOD BASED ON PROGRAM INFORMATION

(75) Inventors: Takeo Horiguchi, Yokohama (JP); Masafumi Tamura, Chofu (JP)

(73) Assignee: Kabushiki Kaish Toshiba, Tokyo (JP)

( * ) Notice: Subject to any disclaimer, the term of this patent is extended or adjusted under 35 U.S.C. 154(b) by 534 days.

(21) Appl. No.: 10/899,170

(22) Filed: Jul. 27, 2004

(65) Prior Publication Data

US 2005/0238317 A1 Oct. 27, 2005

(30) Foreign Application Priority Data

Jul. 28, 2003 (JP) ............... 2003-281160

(51) Int. Cl.
H04N 5/76 (2006.01)
(52) U.S. Cl. ............... 386/69; 386/83; 725/53
(58) Field of Classification Search .......... 386/69, 386/83, 95; 725/53, 46, 60, 61; 709/231
See application file for complete search history.

(56) References Cited

U.S. PATENT DOCUMENTS

| 5,614,940 | A | * | 3/1997 | Cobbley et al. ............. 725/138 |
| 6,154,203 | A | | 11/2000 | Yuen et al. |
| 6,289,169 | B1 | * | 9/2001 | Okuyama .................. 386/83 |
| 6,751,401 | B1 | * | 6/2004 | Arai et al. .................. 386/83 |
| 6,920,278 | B1 | * | 7/2005 | Yano et al. ................. 386/94 |
| 7,099,952 | B2 | * | 8/2006 | Wong et al. ............... 709/231 |
| 7,292,775 | B1 | * | 11/2007 | Boyle et al. ............... 386/83 |
| 2002/0040475 | A1 | * | 4/2002 | Yap et al. ................... 725/39 |
| 2002/0110352 | A1 | * | 8/2002 | Potrebic ...................... 386/46 |
| 2003/0190150 | A1 | * | 10/2003 | Kawasaki et al. ............ 386/83 |
| 2007/0077028 | A1 | * | 4/2007 | Bodkin et al. ............... 386/95 |

FOREIGN PATENT DOCUMENTS

| JP | 2000-41066 | 2/2000 |
| JP | 2000-152116 | 5/2000 |
| JP | 2001-128093 | 5/2001 |
| JP | 2002-16866 | 1/2002 |
| JP | 2002-185904 | 6/2002 |
| JP | 2002-197792 | 7/2002 |
| JP | 2003-189213 | 7/2003 |
| WO | WO 01/78382 A2 | 10/2001 |

OTHER PUBLICATIONS

Notification of Reasons for Rejection mailed Nov. 13, 2007, in Japanese Patent Application No. 2003-281160 (2 pages).
Notification of Second Office Action, dated Nov. 2, 2007, issued by Chinese Patent Office in Chinese Application No. 200410058685.1 and English translation thereof (8 pages).

* cited by examiner

*Primary Examiner*—David E Harvey
(74) *Attorney, Agent, or Firm*—Finnegan, Henderson, Farabow, Garrett & Dunner, L.L.P.

(57) ABSTRACT

A video recording/reproducing apparatus comprises a receiver which receives a broadcast program, an acquiring unit which acquires program information of the broadcast program, a recording unit which records the broadcast program received by the receiver together with the program information acquired by the acquiring unit, a selector which selects a type of the program, and a searching unit which searches a latest program of the type selected by the selector based on the program information acquired by the acquiring unit and the program information recorded by the recording unit.

12 Claims, 6 Drawing Sheets

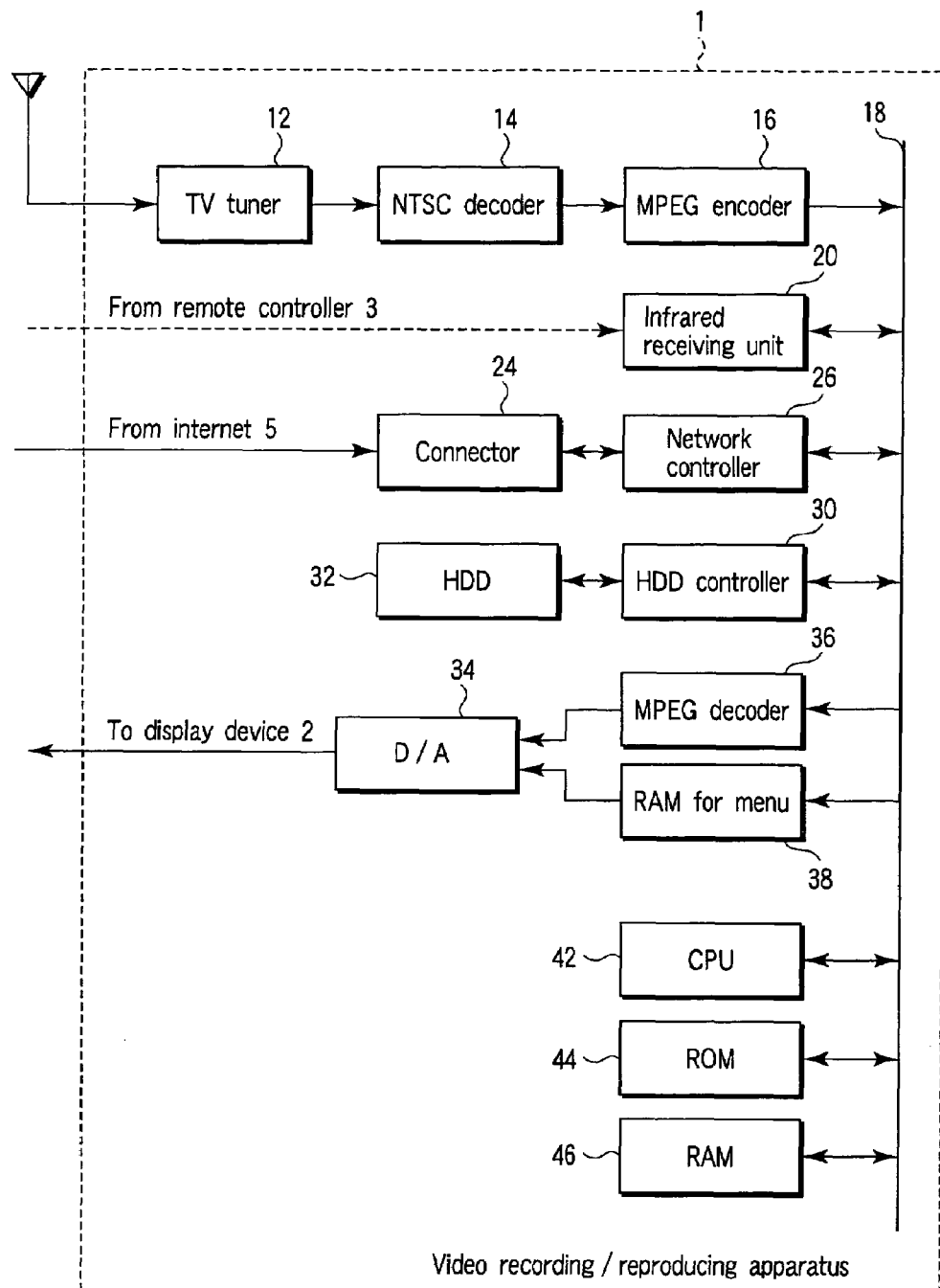
F I G. 2

|  |  |  |  | 2003/07/24/22:10 | |
|---|---|---|---|---|---|

Category / favorite: Drama, Sports, Music, Cooking, Weather forecast, Animation, Quiz, News, Documentary, All

| Date | Time | Broadcast station | Title | Status | Representative image |
|---|---|---|---|---|---|
| 07/24 | 22:00-22:55 | ○○ television | ○○○○ | Broadcasting | ☐ |
| 07/24 | 21:00-22:55 | ×× television | ×××× | Recording | ☐ |
| 07/23 | 22:00-22:55 | △△ television | △△△△ | Watching | ☐ |
| 07/22 | 22:00-22:55 | ○○ television | ○○○○ | Non-watched | ☐ |
| 07/20 | 13:00-13:30 | ×× television | ×××× | Watched | ☐ |

FIG. 6

VIDEO RECORDING/REPRODUCING APPARATUS AND METHOD BASED ON PROGRAM INFORMATION

CROSS-REFERENCE TO RELATED APPLICATIONS

This application is based upon and claims the benefit of priority from prior Japanese Patent Application No. 2003-281160, filed Jul. 28, 2003, the entire contents of which are incorporated herein by reference.

BACKGROUND OF THE INVENTION

1. Field of the Invention

The present invention relates to a video recording/reproducing apparatus and method which records video information such as television programs in large-capacity recording media such as hard disk drives.

2. Description of the Related Art

There has heretofore been a method in which a program recorded in a conventional video recording/reproducing apparatus is reproduced using a recording start time included in recorded program information (e.g., Jpn. Pat. Appln. KOKAI Publication No. 2002-185904).

Here, an apparatus starting time is recorded at an apparatus starting time, and the recorded program information is received from a plurality of recording/reproducing apparatuses using inter-apparatus communication means. The recording start time is extracted from the received recorded program information, and a recorded program start time is compared with the apparatus starting time. When the recording start time comes before the apparatus starting time, the recording start time, recorded program name, and recorded time period are displayed in CRT. Moreover, a dial which asks audiences whether or not to play back the recorded program is also displayed. When the recording start time does not come before the apparatus starting time, or when any recorded program information does not exist, it is displayed that there is not any recorded program.

However, in this document, a video tape is assumed as a recording medium, and all the recorded program information is simply displayed in order from the latest recording start time. When the number of recorded programs increases, it has been difficult to search a desired program.

Further in this document, when the audience does not want to play back the recorded program at the time of starting the apparatus, the recorded program information that has not been watched is stored as a "non-watched recorded program list". Accordingly, information which is possessed by a plurality of recording/reproducing apparatuses and which indicates whether or not recorded programs have been watched can be simplified and managed. However, by the "non-watched recorded program list", it is only seen whether or not the program has been watched, and it cannot be seen that the program has been watched. Furthermore, only the watching of the recorded information is assumed by the recording/reproducing apparatus, and received video information broadcasted in real time cannot be selected as a source of video to be watched.

In this manner, the conventional video recording/reproducing apparatus has a disadvantage that it is difficult to search a desired recorded program. There is also a disadvantage that real-time broadcasted video cannot be selected as a watching object video.

BRIEF SUMMARY OF THE INVENTION

An object of the present invention is to provide a video recording/reproducing apparatus capable of easily selecting a program desired by an audience from a large number of recorded programs or real-time broadcasted programs.

According to an embodiment of the present invention, a video recording/reproducing apparatus comprises:
a receiver which receives a broadcast program;
an acquiring unit which acquires program information of the broadcast program;
a recording unit which records the broadcast program received by the receiver together with the program information acquired by the acquiring unit;
a selector which selects a type of the program; and
a searching unit which searches a latest program of the type selected by the selector based on the program information acquired by the acquiring unit and the program information recorded by the recording unit.

According to another embodiment of the present invention, a video recording/reproducing apparatus comprises:
a receiver which receives a broadcast program;
an acquiring unit which acquires program information of the broadcast program;
a recording unit which records the broadcast program received by the receiver together with the program information acquired by the acquiring unit; and
a display unit which displays the program information recorded by the recording unit and the program information acquired by the acquiring unit together with a recording state or a reproducing state of the program.

According to another embodiment of the present invention, a video recording/reproducing method comprises:
receiving a broadcast program;
acquiring program information of the broadcast program;
recording the received broadcast program together with the acquired program information;
displaying types of the program to allow an user to select one of the types of the program; and
searching a latest program of the selected type based on the recorded program information.

According to another embodiment of the present invention, a video recording/reproducing method comprises:
receiving a broadcast program;
acquiring program information of the broadcast program;
recording the received broadcast program together with the acquired program information; and
displaying the recorded program information and the acquired program information together with a recording state or a reproducing state of the program.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a block diagram of the video recording/reproducing apparatus according to the embodiment;

FIG. 6 is a diagram showing a screen of menu display in a category mode of the embodiment.

DETAILED DESCRIPTION OF THE INVENTION

An embodiment of a video recording/reproducing apparatus according to the present invention will now be described with reference to the accompanying drawings.

Figure 1:
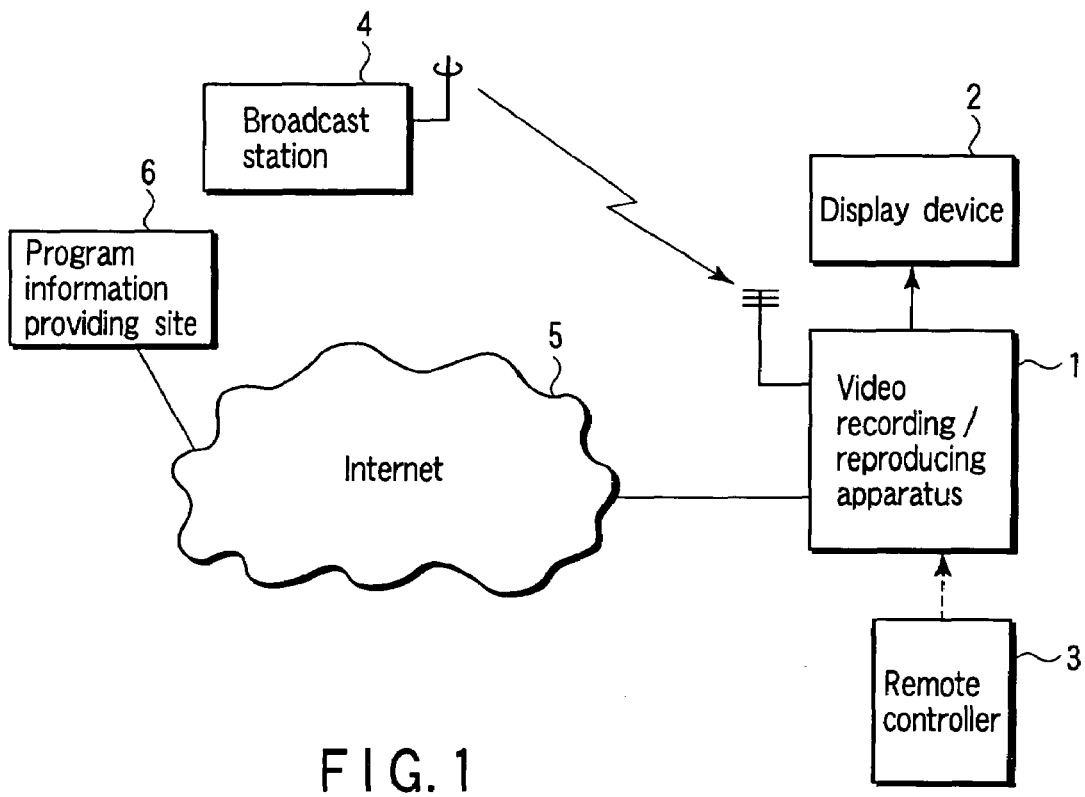
FIG. 1 is a diagram showing the whole system including a video recording/reproducing apparatus according to an embodiment of the present invention.

FIG. 1 is a diagram showing a constitution of the whole system including a video recording/reproducing apparatus according to a first embodiment of the present invention. The present system mainly includes a video recording/reproducing apparatus 1, Internet 5, program providing site 6, and broadcast station 4. The single program providing site 6 or broadcast station 4 is shown, but, in actual, a plurality of sites or stations exist in many cases. The video recording/reproducing apparatus 1 receives television broadcast from the broadcast station 4 to record desired program video, also acquires electronic program guide (EPG) information from the program providing site 6 via the Internet 5, and stores the acquired electronic program guide information. Furthermore, when the program video is recorded, the electronic program guide information concerning the program is recorded as attribute information together with the video.

The video recording/reproducing apparatus 1 supplies a reproduced video signal, a received real-time broadcasted video signal, electronic program guide information, or attribute information to an external display device 2. A remote controller 3 for various operation inputs such as tuning and program selecting is attached to the video recording/reproducing apparatus 1. It is to be noted that television broadcast video may also be input into the video recording/reproducing apparatus 1 via not only radio waves but also wire cables. The program providing site 6 provides electronic program guide information including various information on television programs. The electronic program guide information includes a category of program, broadcast date, broadcast station, title, content (synopsis), representative image constitute of representative scene indicating characteristics of program and the like. Categories include drama, sports, music, cooking, weather forecasting, animation, quiz, news, documentary, movies and the like. It is to be noted that instead of distributing the electronic program guide information from the specialty providing site 6 via the Internet 5, the information may also be distributed together with broadcasted video from the broadcast station 4 via broadcast waves. The display device 2 separated from the video recording/reproducing apparatus 1 may also be integrated.

FIG. 2 is a block diagram showing a constitution of the video recording/reproducing apparatus 1. A CPU 42, ROM 44, RAM 46, MPEG encoder 16, infrared receiving unit 20, network controller 26, hard disk drive (HDD) controller 30, MPEG decoder 36, and RAM for menu 38 are connected to a CPU bus 18. Radio waves from the broadcast station 4 are input into a TV tuner 12 via an antenna, and a broadcast signal of the broadcast station tuned by the TV tuner 12 is supplied to the CPU bus 18 via an NTSC decoder 14 and the MPEG encoder 16. Accordingly, television video information compressed in an MPEG-2 system is transmitted on the CPU bus 18. The television video information is recorded in a hard disk drive 32 which is accessible at random.

An infrared signal indicating an instruction input from the remote controller 3 is received by the infrared receiving unit 20, and transmitted on the CPU bus 18. A connector 24 connected to the Internet 5 is connected to the network controller 26. The electronic program guide information from the program information providing site 6 is transmitted onto the CPU bus 18 via the connector 24 and network controller 26. The electronic program guide information is also recorded in the hard disk drive 32. It is to be noted that when the television video information compressed by the MPEG-2 system is recorded in the hard disk drive 32, program attribute information constituted of the electronic program guide information of the corresponding program is recorded together with video information. The program attribute information also includes a reproduction state indicating that the recorded program has not been watched yet, has been halfway watched, or has been watched to the last. Television video mentioned herein also includes sound. It is to be noted that the sound is compressed by MPEG-1 layer 2.

The MPEG compressed video information read from the hard disk drive 32 is supplied to the display device 2 via the MPEG decoder 36 and a D/A converter 34. Moreover, a menu screen constituted of the electronic program guide information and program attribute information read from the hard disk drive 32 and stored in the RAM for menu 38 is also supplied to the display device 2 via the D/A converter 34.

The video recording/reproducing apparatus 1 has a timer recording function, and the program can be selected from the electronic program guide information displayed in the screen, and reserved. In the reservation, instead of individually selecting the program, repeated recording in which a regular program broadcasted at the same time every week is recorded with one reservation, or a navigation recording function of automatically searching a program matching a keyword from the electronic program guide information to record the program may also be performed.

Figure 3:
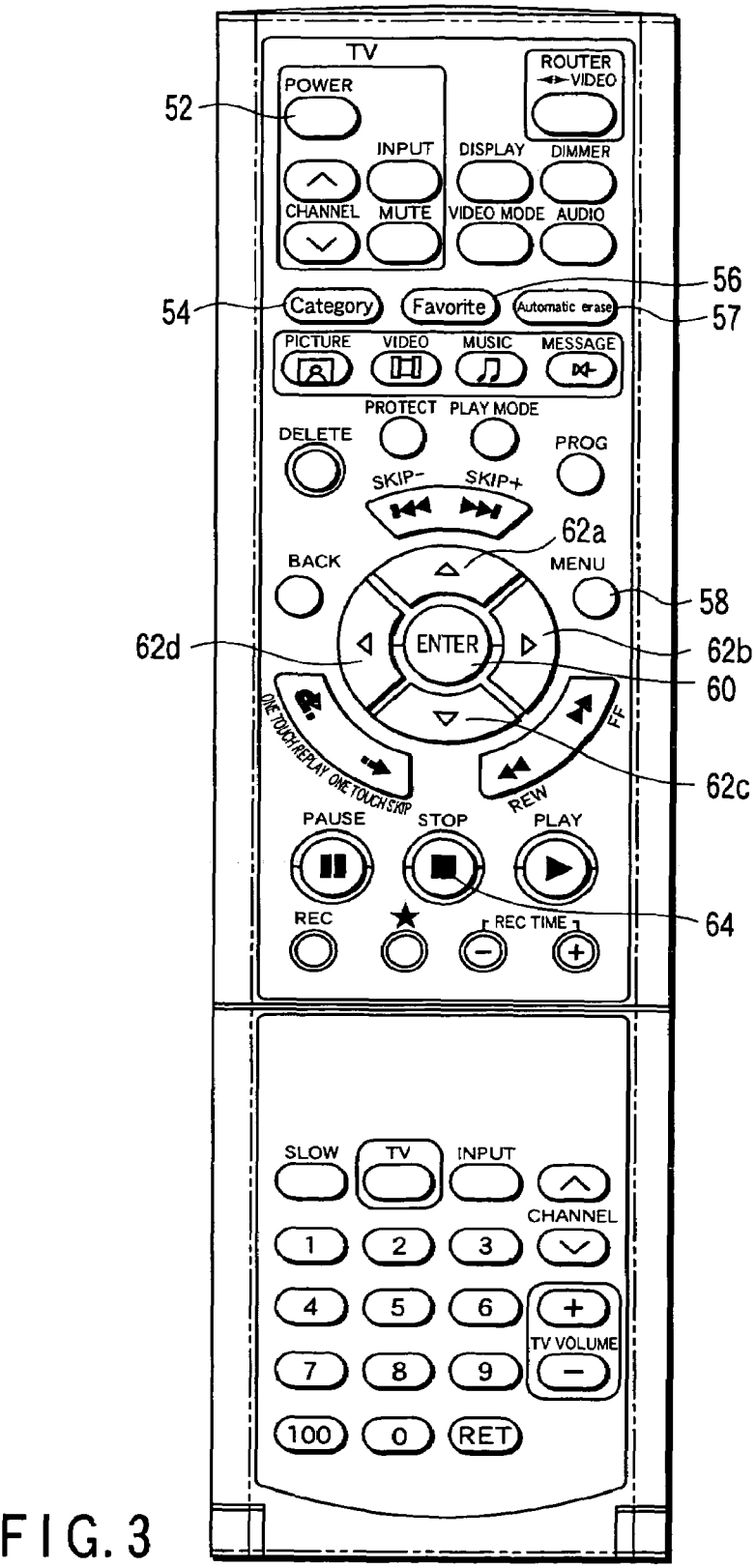
FIG. 3 is a diagram showing an arrangement of buttons of a remote controller according to the embodiment.

FIG. 3 is a plan view showing an arrangement of keys of the remote controller 3. The remote controller 3 includes a power button 52, category button 54, favorite button 56, automatic erase button 57, menu button 58, enter button 60, up/down/right/left arrow buttons 62a, 62b, 62c, 62d, and stop button 64. The video recording/reproducing apparatus 1 is constantly on so that reserved recording is possible, and screen display of the display device 2 is turned on/off by the power button 52. The category button 54 or the favorite button 56 sets a category mode or a favorite mode as a menu mode. The category mode and favorite mode will be described later in detail. By the automatic erase button, an automatic erase mode (described later in detail) for erasing an old recorded program having the same title at a recording time, play-back time of the recorded program, or watching time of the broadcasted program is designated. In the present embodiment, the menu screen is displayed, when the power button 52 is pressed. However, by the menu button 58, the menu screen is displayed at an optional time. The enter button 60 is a button for defining the operation input, and the arrow buttons 62 are buttons for selecting various items.

Figure 4:
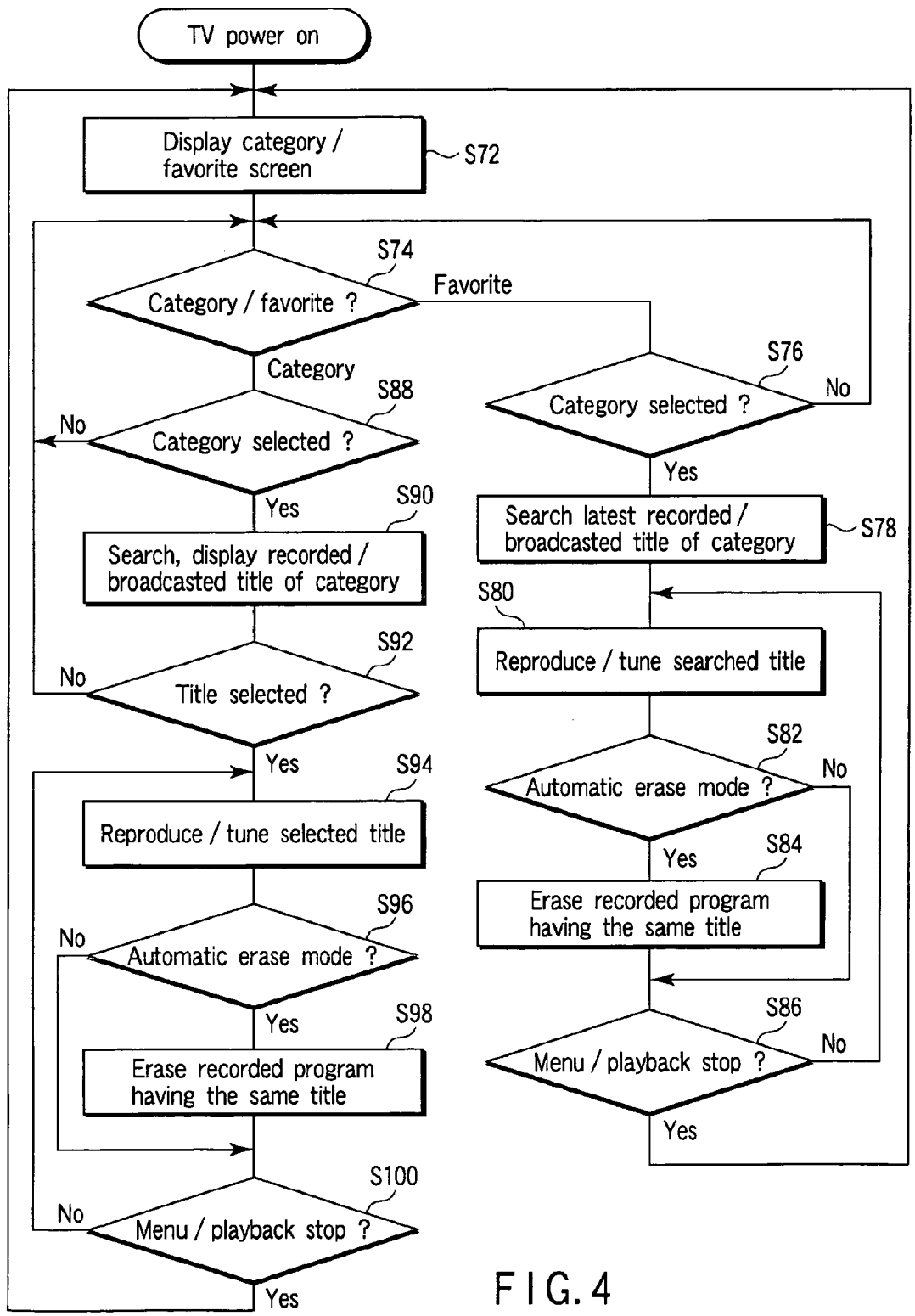
FIG. 4 is a flowchart showing a watching operation according to the embodiment.
Figure 5:
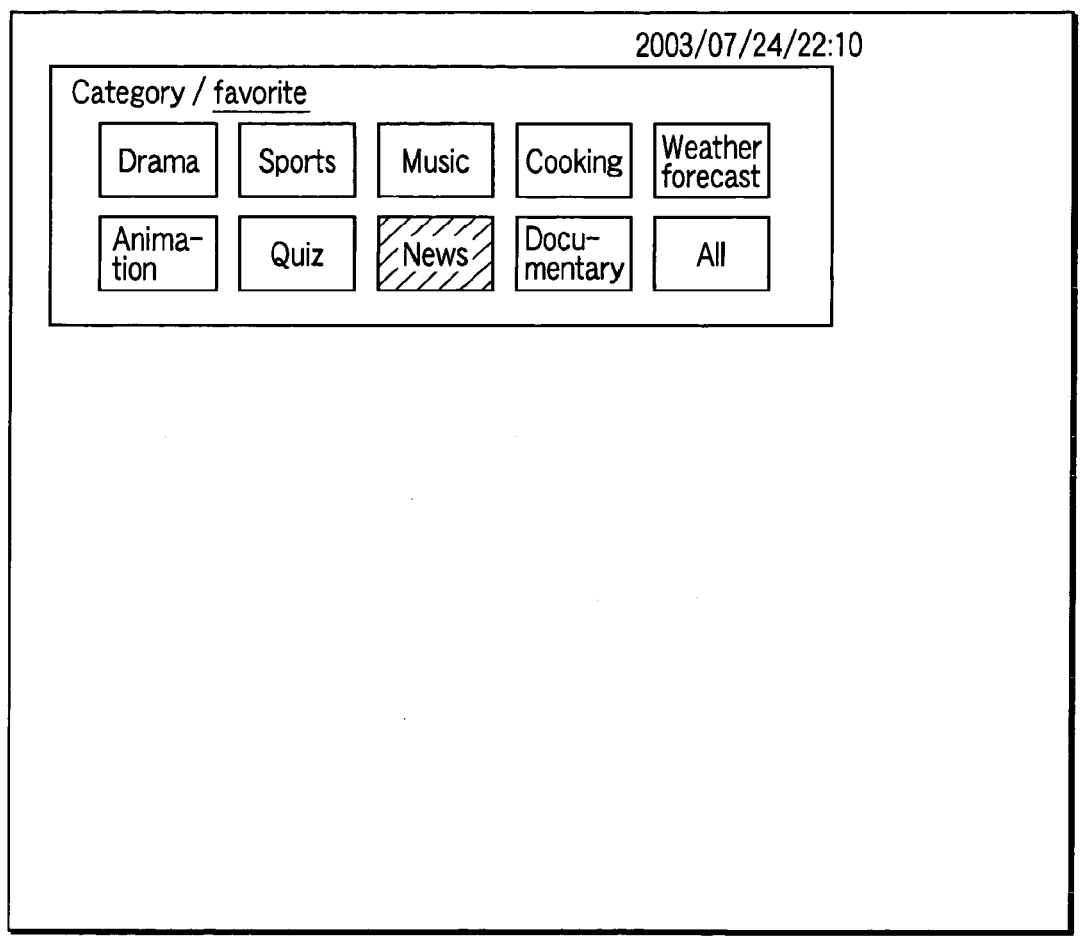
FIG. 5 is a diagram showing an initial screen in which menu is displayed according to the embodiment.

An operation at a time when the menu button 58 is turned on will be described with reference to FIG. 4. When an audience is to watch a certain program, the audience presses the power button 52. In step S72, an initial screen "category/favorite screen" shown in FIG. 5 is displayed. In the screen, a large number of buttons indicating category names, and an all category button which does not designate any category are displayed. Moreover, a text "category/favorite" indicating the menu mode (mode by category, favorite mode) is displayed. In the text display, underlined display indicates a presently set mode. Here, the favorite mode is set. The mode is switched by the category button 54 or the favorite button 56 of the remote controller 3. In the favorite mode, when the category is only designated, the watching of latest video (including not only recorded video but also real-time program being broadcasted (non-recorded)) of the category can be automatically started.

Then, in the favorite mode, designation of the category is waited for in the display of FIG. 5. The category is selected with the arrow button 62 of the remote controller 3. When the enter button 60 is pressed in a selected state, the selection is determined. Therefore, it is determined in step S76 whether or not the category has been selected. When the category is selected, in step S78 the latest program of the category is searched based on the attribute information of the television video information recorded in the HDD 32, and the electronic program guide information. That is, the recorded program having the latest time, or the title of the category being broadcasted, including the present time, is searched. In step S80, the watching (playback/tune) of the searched title is started.

Therefore, the audience can see the latest video of the category by only one action for selecting the category in the favorite mode. This favorite mode is significant for the latest programs having a high real-time property, such as news and weather forecast. The mode is effective for watching an old program which is little worth watching. In the present embodiment, the automatic erase mode can be selectively set in accordance with the above-described principle. In the automatic erase mode, when the program having the same title as that of the program to be watched now is recorded in the HDD 32, the recorded program is automatically erased. To save a storage capacity of the HDD 32, the program having a low watching possibility is erased.

It is determined in step S82 whether or not the automatic erase mode is set. When it is determined that the automatic erase mode is set, the recorded program having the same title as that of searched information is erased in step S84. When it is determined in step S86 that the menu button 58 or the playback stop button 64 has been pressed, the process returns to step S72, and the category/favorite screen (FIG. 5) is displayed.

On the other hand, in the category mode, when a list of information on the recorded programs concerning the selected category or the programs being broadcasted is displayed, and the audience selects the desired program from the list, the watching of the selected video can be started. Therefore, it is determined in step S88 whether or not the category has been selected. When the category is selected, in step S90 the video of the category is searched based on the attribute information and electronic program guide information of the recorded information in the HDD 32, and the video is listed/displayed in order from the latest video. FIG. 6 shows an example of list display of the category mode. Here, category "drama" is selected. A representative image is included in the electronic program guide information, is an image indicating characteristics of a certain program, and improves convenience in selecting the program to the audience. A status indicates a recording state or playback state of each program. The recording state includes recorded, recording, and broadcast states. The playback state includes a non-watched state, a watching state, and a watched state to the last. The recorded state indicates the program which has been recorded. The recording state indicates a program being recorded, and the broadcast state indicates a program being broadcasted. The non-watched state indicates a program which has been recorded but has not been watched, the watching state indicates that the recorded program has been watched halfway, and the watched state indicates the recorded program which has been watched to the last. The watching, non-watched, or watched state can be determined in accordance with a value of a counter which is disposed in a part of attribute information attached to the recording information of the HDD 32 to indicate a watched time. It is to be noted that instead of listing up all the programs of the corresponding category, keywords such as the broadcast station, status, and characters may be designated beforehand to search the keyword, and further a limited list may also be displayed.

In the category mode, the selection of a title is waited for in the display of FIG. 6. In the initial state of FIG. 6, the latest program (top program) is highlight-displayed, and this indicates that the program is tentatively selected. When the up/down arrow keys 62*a* and 62*c* of the remote controller 3 are pressed, the highlighted title is successively switched upwards/downwards. When the enter button 60 is pressed, the highlighted/displayed title at that time is finally selected. It is to be noted that when the down arrow key 62*c* continues to be pressed, the list is scrolled, and the past programs can also be displayed. It is determined in step S92 whether or not the title has been selected. When the title is selected, in step S94 the watching (reproducing/tuning) of the selected title is started.

Therefore, when the category is selected in the category mode by the audience, only the contents corresponding to the category are listed/displayed in order from a new content, and the program to be watched can be searched in a short time.

In the same manner as in the favorite mode, when it is determined in step S96 that the automatic erase mode has been set, the recorded program having the same title as that of the selected information is erased in step S98. When it is determined in step S100 that the menu button 58 or the stop button 64 has been pressed, the process returns to step S72, and the category/favorite screen (FIG. 5) is displayed.

Figure 7:
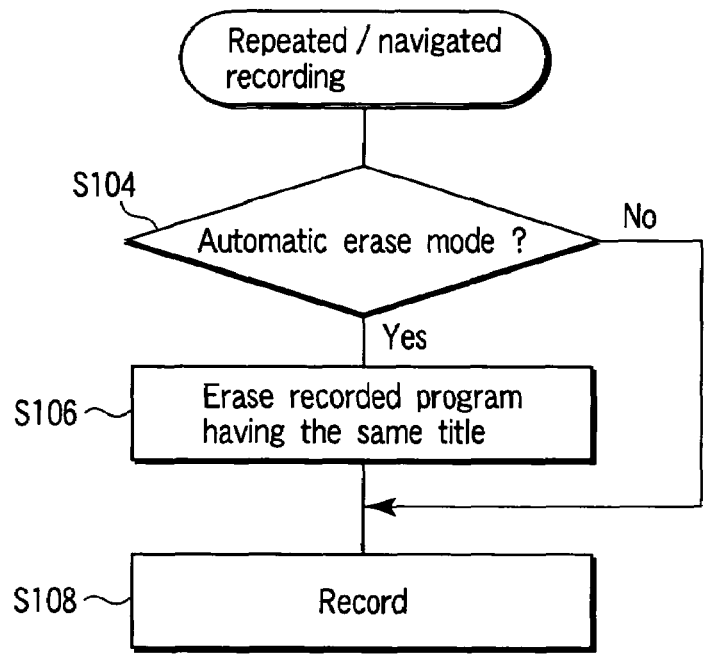
FIG. 7 is a flowchart showing an operation in a repeated recording or navigated recording mode of the embodiment.

An operation at a recording time will be described with reference to FIG. 7. The operation has an effect similar to that of the automatic erase mode. Since the present embodiment has the repeated recording function and navigated recording function as described above, many programs are recorded in the HDD 32. In the recorded programs, the latest program having the real-time property is significant, and some of old programs are sometimes little worth seeing. Therefore, at a reserved time of the repeated or navigated recording, it is determined in step S104 whether or not the automatic erase mode has been set before starting the recording. When it is determined that the automatic erase mode has been set, in step S106 the recorded program having the same title as that of the program to be recorded is erased. For example, the mode is significant for the latest programs having high real-time properties, such as news and weather forecast. The mode is effective for the repeated or navigated recording of the old program little worth seeing.

As described above, according to the embodiment, in the apparatus which records/reproduces the video using random accessible recording mediums such as a hard disk drive, shortcut buttons to the latest titles for each category (including not only the recorded title but also a title being broadcasted) are displayed as shown in FIG. 5. When any one of the buttons is selected, the watching of the latest title corresponding to the selected button is started. As shown in FIG. 6, search results for each category are listed/displayed in order from a new result, the status is also displayed, and accordingly the desired program can be easily selected on the screen. When a function of erasing the past recorded program is set during the watching or the recording of the latest program having the same title, the program having a low possibility of watching can be automatically erased, and a storage capacity of the HDD 32 can be effectively used.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, in the above description, the recording medium is a hard disk drive, but the medium is not limited to this, and a removable medium such as DVD may also be used. In the video recording/reproducing apparatus 1, the CPU 42 is integrated with the HDD 32, and the display device 2 is separated, but the apparatus may also be integrally constituted as a notebook-size personal computer. Alternatively, a wireless media station which is connected to the notebook-size personal computer by radio and which expands a function of the notebook-size personal computer may also be constituted.

What is claimed is:

1. A video recording/reproducing apparatus comprising:
   a receiver which receives broadcast programs;
   an acquiring unit which acquires program information of the broadcast programs, the program information including category information of the broadcast programs;
   a recording unit which records broadcast programs received by the receiver together with the program information acquired by the acquiring unit;
   a selector which selects a category of the broadcast programs;
   a searching unit which searches for a latest program of the category selected by the selector based on the program information currently acquired by the acquiring unit and the program information previously recorded by the recording unit;
   a video reproducing unit which reproduces the latest program of the category selected; and
   an erase unit which erases an old broadcast program recorded by the recording unit having a same title as that of the latest program at one of a recording time, a play-back time of the recorded program, and a watching time of the broadcast programs.

2. The video recording/reproducing apparatus according to claim 1, wherein the acquiring unit acquires the program information via Internet.

3. The video recording/reproducing apparatus according to claim 1, wherein the acquiring unit receives the program information together with the broadcast programs.

4. The video recording/reproducing apparatus according to claim 1, wherein the category includes drama, sports, music, cooking, weather forecasting, animation, quiz, news, documentary, and movies.

5. A video recording/reproducing apparatus comprising:
   a receiver which receives broadcast programs;
   an acquiring unit which acquires program information of the broadcast programs, program information including category information of the broadcast programs;
   a recording unit which records the broadcast programs received by the receiver together with the program information acquired by the acquiring unit;
   a selector which selects a category of the broadcast programs;
   a display unit which displays a list of program information of the selected category, the broadcast programs including at least one of a first program recorded by the recording unit and a second program being broadcasted, together with a recording state or a reproducing state of broadcast programs;
   a video reproducing unit which reproduces a selected one of the first program and the second program; and
   an erase unit which erases an old broadcast program recorded by the recording unit having a same title at a recording time, a play-back time of the recorded program, or a watching time of the broadcast programs such that the list of program information displayed by the display unit includes program information of a latest program of programs having the same title.

6. The video recording/reproducing apparatus according to claim 5, wherein the acquiring unit acquires the program information via Internet.

7. The video recording/reproducing apparatus according to claim 5, wherein the acquiring unit receives the program information together with the broadcast programs.

8. The video recording/reproducing apparatus according to claim 5, wherein the recording state includes recorded, recording, and broadcast states.

9. The video recording/reproducing apparatus according to claim 5, wherein the reproducing state includes non-watched, watching, and watched states.

10. The video recording/reproducing apparatus according to claim 5, wherein the display unit displays the list of program information in order from new information.

11. The video recording/reproducing apparatus according to claim 10, further comprising:
    a program selector which selects one of the program information displayed by the display unit; and
    a starting unit which starts reproducing a program corresponding to the program information selected by the program selector.

12. A video recording/reproducing method comprising:
    receiving broadcast programs;
    acquiring program information of the broadcast programs, the program information including category information of the broadcast programs;
    recording the received broadcast programs together with the acquired program information;
    displaying mode information of the broadcast programs to allow an user to select one of the-types a favorite mode and a category mode of the broadcast programs;
    selecting a category mode and a category of the broadcast programs;
    searching for programs of the selected category based on the program information currently acquired by the acquiring unit and the recorded program information previously recorded by the recording unit;

displaying a list of program information of the searched programs of the selected category, the searched programs including at least one of a first program recorded by the recording unit and a second program being broadcasted;

reproducing a selected one of the first program and the second program; and erasing an old broadcast program which has been recorded and has a same title at a recording time, a play-back time of the recorded program, or a watching time of the broadcast programs such that the list of program information includes program information of a latest program of programs having the same title.

* * * * *

UNITED STATES PATENT AND TRADEMARK OFFICE
CERTIFICATE OF CORRECTION

PATENT NO. : 7,519,269 B2  Page 1 of 1
APPLICATION NO. : 10/899170
DATED : April 14, 2009
INVENTOR(S) : Horiguchi et al.

It is certified that error appears in the above-identified patent and that said Letters Patent is hereby corrected as shown below:

Title Page, Item (73), in the Assignee, change "Kaish" to --Kaisha--.

Claim 5, column 8, line 7, change "program" to --the program--.

Claim 5, column 8, line 19, change "broadcast;" to --the broadcast;--.

Claim 12, column 8, line 60, change "one of the-types a favorite mode" to --one of a favorite mode--.

Signed and Sealed this

Second Day of June, 2009

JOHN DOLL
*Acting Director of the United States Patent and Trademark Office*